US005426725A

United States Patent [19]

Kilgore

[11] Patent Number: 5,426,725

[45] Date of Patent: Jun. 20, 1995

[54] PRIORITY BASED GRAPHICS IN AN OPEN SYSTEM WINDOWS ENVIRONMENT

[75] Inventor: William B. Kilgore, Phoenix, Ariz.

[73] Assignee: Honeywell Inc., Minneapolis, Minn.

[21] Appl. No.: 899,440

[22] Filed: Jun. 16, 1992

[51] Int. Cl.[6] ........................ G09G 5/40; G06T 11/60

[52] U.S. Cl. .................................... 395/147; 395/135; 345/113; 345/114

[58] Field of Search ........................ 395/135, 147, 158; 345/113-114; 348/584-586

[56] References Cited

U.S. PATENT DOCUMENTS 5,185,858 2/1993 Emery et al. ........................ 395/158

5,264,837 11/1993 Bueler ................................ 345/115

*Primary Examiner*—Mark K. Zimmerman

*Assistant Examiner*—J. Feild

*Attorney, Agent, or Firm*—A. A. Sapelli; W. Udseth

[57] ABSTRACT

A graphics display has the capability of displaying both alpha numeric images and graphic images and properly blending these images. The blending is done timely and efficiently while still utilizing a memory structure wherein the graphic pixmap is stored in one memory and the alpha pixmap is stored in a second memory. A priority value is assigned to each pixel of the display. The priority value indicates what the desired display structure is to be. The priority value, the graphic pixel value, and the alpha pixel value are all polled and the appropriate pixel value is transmitted to a display device.

3 Claims, 3 Drawing Sheets

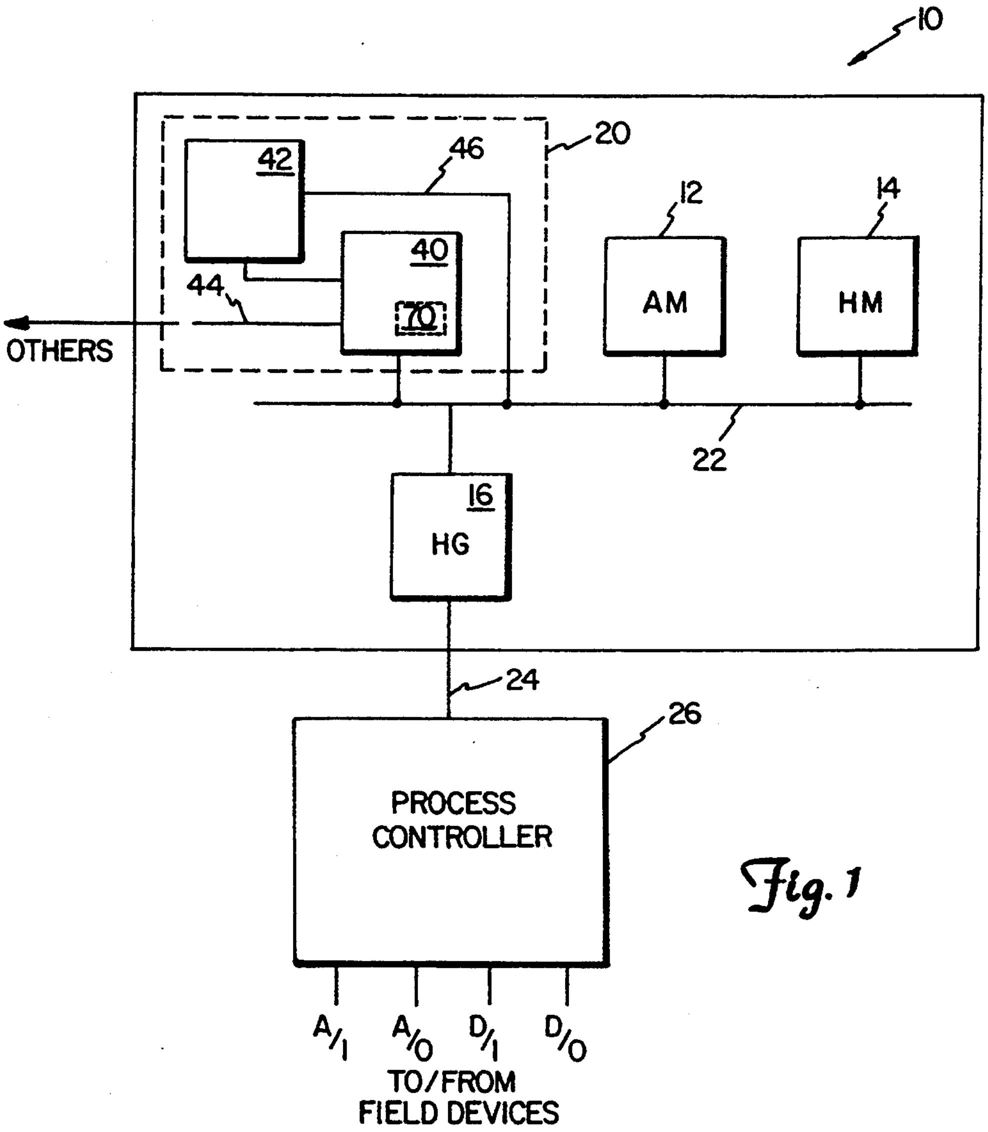
Fig. 1
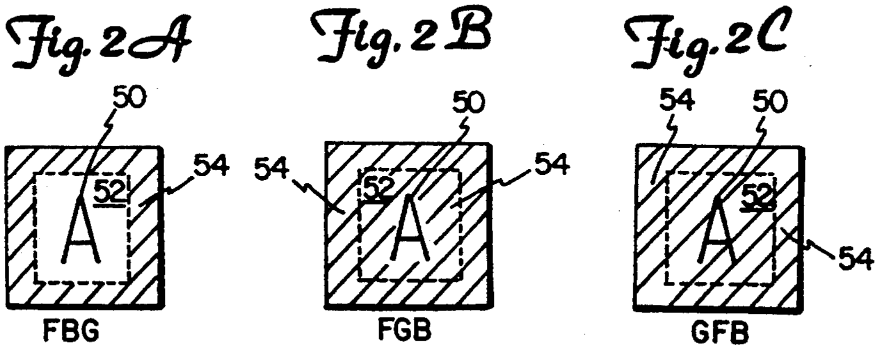

| | | | | | |
|---|---|---|---|---|---|
| | 1 | 1 | 0 | 0 | – ALPHA (A) |
| | 1 | 0 | 1 | 0 | – GRAPHIC (G) |
| FBG | A | A | A | A | |
| FGB | A | A | G | A | |
| GFB | G | A | G | A | |

PRIORITY BASED GRAPHICS IN AN OPEN SYSTEM WINDOWS ENVIRONMENT

RELATED APPLICATIONS

The present application is related to the following:

a) patent application, Ser. No. 899,198, entitled "An Open Distributed Digital System" by K. Staggs et al;

b) patent application, Ser. No. 07/899,441, entitled "A Method for Controlling Window Displays in an Open System Windows Environment" by K. Staggs et al;

c) patent application, Ser. No. 07/899,199, entitled "Directly Connected Display of a Process Control System in an Open System Windows Environment" by B. Kilgore;

d) patent application, Ser. No. 07/899,197, entitled "Device Dependent Layer of a Windowing System for a Process Control System", by B. Kilgore et al;

e) patent application, Ser. No. 07/899,442, entitled "A Method of Coupling Computer Platforms . . ." by D. Phillips et al;

all of the above filed on even date herewith, and all of the above assigned to Honeywell Inc., the assignee of the present application.

FIELD OF THE INVENTION

The present invention is used in a display system using bit mapped graphics. More specifically the present invention provides a means for displaying both graphic images and alpha numeric images on the same display screen where one of those two images is intended to be superimposed upon the other.

BACKGROUND OF THE INVENTION

In a process control environment a process control system controls a particular process, e.g., a continuously operating manufacturing plant. At different points, or stations, along the process, there is available a data element or variable which can be measured and/or controlled. These data elements may include pressure, flow, temperature, and calculated value which may include some of the aforementioned data elements. Within the process control system there is a need for information to be displayed at various points in the process. This display will allow an operator to make the necessary adjustments and/or decisions regarding the process.

In the past it was necessary to display both graphic images and alpha numeric images (alpha images) upon the display terminal. In previous process control systems such, as the TDC 3000 manufactured and sold by Honeywell Inc., alpha numeric data (or alpha data) was stored in one memory while graphics data was stored in another memory. Three possible display structures communicate the desired message to the display. The first display structure provides for the alpha foreground to be superimposed upon the alpha background, which was then superimposed upon the graphics image. The second possible display structure has the alpha foreground, superimposed upon the graphic image, which was then superimposed on the alpha background. The third and final possible display structure has the graphic image, superimposed on the alpha foreground, which was then superimposed upon the alpha background. These three possible display structures will be discussed in further detail later the present application.

A more recent concern in the field of process control systems is the ability for external systems to communicate with the process control system. Current process control systems such as the TDC 3000, previously mentioned, all provide a closed architecture allowing communication between only those devices which are part of the process control system. More recently it has been desired that an open architecture be devised thereby allowing external computer systems to access data and information from the process control system. This would allow connections between such systems as a VAX computer system manufactured by Digital Electronics Corp., Maynard, Massachusetts or an IBM System manufactured by International Business Machines. Many other computer systems exist and the afore-mention open architecture would allow virtually all of these systems to communicate with the process control system.

X-windows protocol provides for a network based, hierarchial windowing system which allows for high speed graphics. (X-windows was developed by the Massachusetts Institute of Technology and is a well known window system to those skilled in the art.) The X-windows protocol provides the ability to design an open architecture whereby current process control systems can be connected to outside computer systems via standard networks (e.g., DECnet manufactured by the Digital Electronics Corporation of Maynard, Massachusetts). X-windows protocol works as a bit map graphic system which allows high speed and high definition graphics.

Within the windowing system there is a server which controls each display device and a plurality of input devices (in the present embodiment referred to as an X-server). The display device is typically a Cathode Rate Tube (CRT) and the input device typically consists of key boards and/or pointing devices including a mouse, roller ball pointer, or a touch screen. Devices which are connected to the server and which attempt to communicate with the server are referred to as clients. Clients request certain actions of the server and the server may or may not carry out these requests. These actions include displaying information, reading information from the input devices, or moving things on the CRT.

As previously mentioned alpha data and graphic data are typically separated in process control systems. These two types of data are stored in separate memory devices and require proper blending to be properly displayed on the CRT. When a client requests that graphic and alpha numeric data be blended within the windowing system, the system cannot efficiently handle this blending.

When X-windows is called upon to blend two images together, the system will perform a Logical "OR" on the two images. This creates an unknown and undesirable result. To achieve the correct results in X-windows requires fairly complex logic operations. Seven bit wise logic operations are required to achieve the proper result. Execution of these operations causes this blending to be both slow and tedious.

SUMMARY OF THE INVENTION

The present invention provides an extension to the windows system which supplies the necessary logic to perform the blending of the graphic and alpha numeric images (alpha images). This allows the windowing system to provide the appropriate blending in one step as opposed to seven logical steps.

As mentioned, graphics data or a graphics pixmap and alpha numeric data or a alpha pixmap are stored in two separate memories. Both the graphics pixmap and the alpha pixmap contain color data as well as intensity, blank and reverse indicators.

A third pixmap is maintained which contains a priority value for each of the individual pixels. These priority values describe the desired display structure. A priority value corresponds with each of the pixel value in the graphics pixmap and the alpha numeric pixmap.

To generate the correct image, a tight loop is maintained in which certain logic operations occur to determine which of the pixel values is sent to the display. Initially the pixel to be drawn must be identified. The next step is to read the priority value, the alpha pixel value, and the graphic pixel value from respective memories. Based upon the priority value, the appropriate pixel value is sent to the display.

It is an object of the present invention to provide proper blending of alpha images and graphic images to obtain a desired display image. It is desired that this result be obtained while operating in a system using the X-windows protocol.

It is another object of the present invention to provide the aforementioned blending at an appropriate rate of speed. Since as many as seven operations are required in the X-windows protocol to achieve the desired blending, it is an object to reduce the number of operations required and thus increase the speed.

It is a further object of the present invention to provide a system which uses the X-window protocol while also utilizing the previous two memory technique in which graphic data is stored in one memory and alpha data is stored in a second memory.

BRIEF DESCRIPTION OF THE DRAWINGS

Other objects features and advantages of the invention will be apparent from the following detained description taken in conjunction with the accompanying drawings, in which:

FIG. 1 is a block diagram showing a process control system having at least one display;

FIGS. 2*a*–2*c* are illustrations of the three different graphical display formats which could be used;

DETAILED DESCRIPTION OF THE INVENTION

Figures 3, 4:
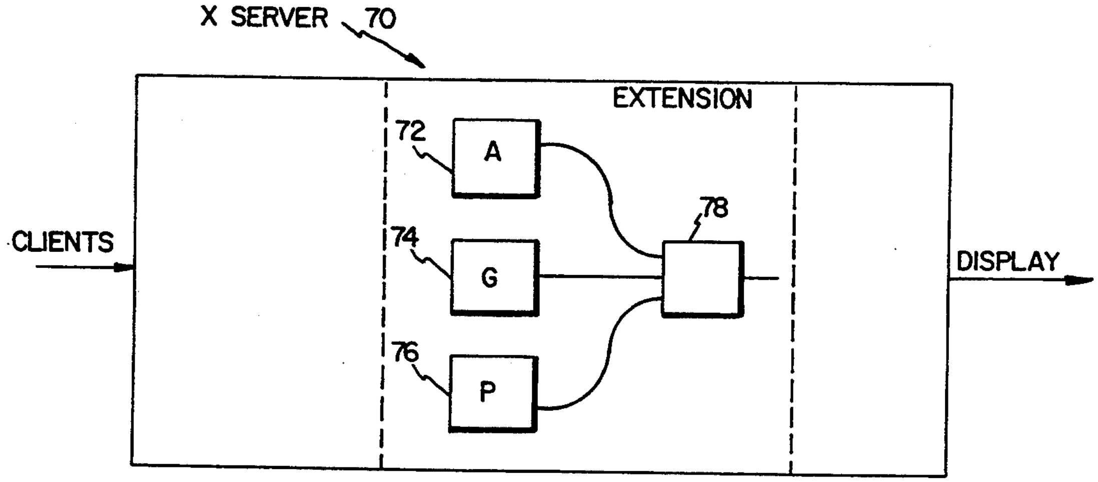
FIG. 3 is a block diagram showing the structure of the present invention including three memories for alpha data, graphic data and priority values.
FIG. 4 is a table illustrating the decision making process of the present invention.

Referring now to FIG. 1 there is shown a process control system 10 which has a plurality of modules and parts. For example there exists an application module 12, history module 14, highway gateway 16 and a universal station 20 all of which are connected to a local control network (LCN) 22. Other modules may exists within the process control system 10 however are not shown in FIG. 1.

Connected to process controller 10, via data highway 24 is a process controller 26. The process controller 26 has a plurality of inputs/outputs which extend to field devices such as gauges, sensors, etc. Further information about a process control system 10 or plant management system may be had by referring to U.S. Pat. No. 4,607,256 which is assigned to the assignee of the present application.

Within the process control system 10 and within the universal station 20 is a co-processor 40 used for providing a windowing system operating under the X-windows protocol. In the preferred embodiment the co-processor is a Motorola processor operating UNIX. (UNIX is an operating system developed by American Telephone and Telegraph, Inc. (AT&T) which is well known to those skilled in the art.) Connected to co-processor 40 is a display 42 and possibly a plurality of other devices including other computer systems. These other computer systems are connected through bus connection 44.

Co-processor 40 has within it windows server 70 which operates using the X-windows protocol. It is within this windows server 70 where the present invention resides and allows display 42 to provide properly blended images while also allowing many other computer systems to receive and display these properly blended images. The operation of the windows server 70 as well as the present invention, will be described in considerable detail later in this application.

Referring now to FIG. 2, shown are the three possible display structures involving alpha and graphic data. It must be understood that every alpha image consists of a foreground and a background. For example in FIG. 2A the image of the letter "A" is the alpha foreground and the white space behind and surrounding the image of the letter "A" is the alpha background.

Still referring to FIG. 2A there is shown the display structure wherein the alpha foreground 50 is superimposed upon the alpha background 52 which is then superimposed upon the graphic image 54. Here the graphic image 54 surrounds the alpha background 52 for illustrative purposes. This display structure is referred to a foreground, background, graphics (FBG).

Referring now to FIG. 2B, shown is the graphic structure wherein the alpha foreground 50 is superimposed upon the graphic image 54 which is then superimposed upon the alpha background 52. (Note that the alpha background is not visible here because the graphic image is superimposed thereon.) While not shown in FIG. 2B, it is conceivable that the alpha background 52 could be a different and distinct color from that of the graphic image 54. Such color differences would make the alpha background 52 distinguishable from the graphic image 54 thus allowing portions of the alpha background 52 to show through. In this display structure the graphic image 54 does not obstruct or obscure the alpha foreground 50. This display structure is referred to as foreground, graphic, background (FGB).

Referring now to FIG. 2C, illustrated is the display structure wherein the graphic image 54 is superimposed upon the alpha foreground 50, which is then superimposed upon the alpha background 52. Note here that the graphic image 54 obstructs and obscures both the alpha foreground 50 and the alpha background 52. Also note that the display structure of FIGS. 2A, 2B and 2C are all distinctly different and create a much different image when displayed upon the system display. This third display structure is referred to as graphic, foreground, background (GFB).

The present invention uses bit-mapped graphics to display images. Bit-mapped graphics causes the entire screen to be broken up into a plurality of pixels arranged in a grid. An image is created by illuminating certain pixels while not illuminating others. For example, a horizontal line could be displayed by illuminating a horizontal row of pixels.

When blending graphic images and alpha images, it is essential to know whether the images exist at certain pixels. An image is said to exist at a pixel when it is necessary for the pixel to be illuminated in order to display the image.

Referring now to FIG. 3 there is shown a functional block diagram of the windows server 70, which resides in co-processor 40. Within the co-processor 40 the windows server 70 handles many tasks including management of the displays and data input device. These data input devices may include keyboards and/or a pointing device such as a mouse or a touch screen.

The windows server 70 receives requests from its clients. Clients to windows server 70 may include free standing external computer systems or systems within process control system 10. The request received from clients may include, for example, request to display certain data in a particular structure, request to query for more input from the keyboard and/or pointing devices and requests to display queries to the operator.

The present invention is concerned with a request from a client for the windows server 70 to display certain information. As previously discussed this information typically comprises an alpha image made up of foreground 50 and a background 52, as well as a graphic image.

Alpha data to be displayed is stored in alpha memory 72. Similarly, the graphic data to be displayed is stored in graphic memory 74. The data stored in alpha memory 72 and graphic memory 74 is typically a pixmap for the alpha image and the graphic image, respectively. A third pixmap is stored in priority value memory 76. Priority value memory 76 contains a pixmap which assigns a priority value or display structure value to each pixel of the image. This priority value indicates which of the three display structures, shown in FIG. 2, are to be used at that particular pixel.

Windows server 70 contains a logic device 78. Logic device 78 is connected to alpha numeric memory 72, graphics memory 74 and to priority value memory 76. Logic device 78 implements the logic displayed in FIG. 4.

Referring now to FIG. 4, logic device 78 must determine which of the pixel values is to be send to the display. To make this determination, logic device 78 polls the alpha pixel value, graphic pixel value, and the priority value for each pixel. If the priority value indicates the display structure shall be foreground, background, graphics (FBG) then the pixel value from the alpha numeric value memory 72 is transmitted to the display device. If the priority value indicates the desired display structure shall be foreground, graphics, background (FGB) and if the alpha memory contains a background value or the alpha foreground pixel is invisible, then the pixel value from graphic memory 74 is transmitted to the display provided there exists a graphics foreground color. However, if the alpha pixel is visible (i.e., an alpha numeric symbol exists at that pixel) then the alpha pixel value is then transmitted to the display. Lastly if the priority value indicates the display structure is to be graphics foreground background (GFB) and if the graphics symbol is present at the chosen pixel then the graphic pixel value is transmitted to the display device. However, if the graphic symbol is not present at the chosen pixel then the alpha pixel value is transmitted to the display.

Referring again to FIG. 1, there is provided a connection 46 between display 42 and local control network 22. This connection provides for redundancy should co-processor 40 fail for some reason. Connection 46 will ensure that the display system will continue displaying the vital operations of the process control systems 10 should co-processor 40 fail.

Figure 5:
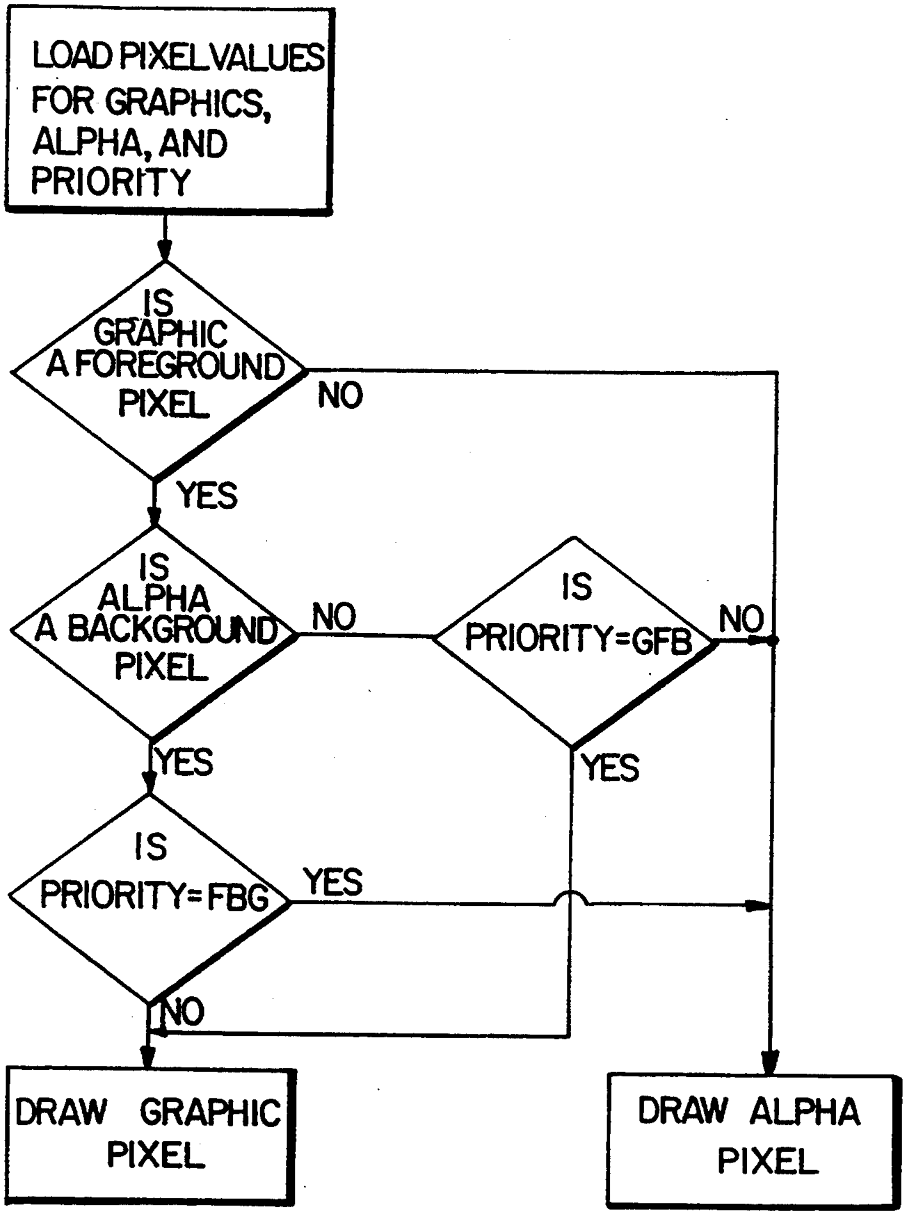
FIG. 5 is a flow chart illustrating the logical operations of the present invention.

Referring now to FIG. 5, a flow diagram of the logic implemented by the present invention is shown. Initially, the alpha pixel value, the graphic pixel value, and the priority value for the pixel to be drawn are polled. The graphic pixel value is tested to determine if a graphic image exits at that pixel. If a graphic image does not exist at that pixel, the alpha pixel is then drawn.

Next the alpha pixel value is tested to determine if the alpha pixel is a background or a foreground pixel. If the alpha pixel is an alpha foreground pixel, and the priority value indicates a GFB display structure is desired, then the graphic pixel is drawn. However, if the alpha pixel is an alpha foreground pixel and the desired display structure is not GFB, than the alpha pixel is drawn.

Next, if the alpha pixel is an alpha background pixel, and the priority value indicates the desired display structure is FBG, then the alpha pixel is drawn. If the alpha pixel is an alpha background pixel and the desired display structure is not FBG, then the graphic pixel is drawn.

The present invention has been described in considerable detail. Those skilled in the art will understand certain modifications and changes will be made to the present invention without departing from the scope and spirit of the invention as claimed in the attached claims.

What is claimed is:

1. An apparatus for displaying information, the information to be displayed including an alpha image and a graphic image, comprising:

a) a bit mapped display means for displaying information, said bit mapped display means comprised of a screen having a plurality of pixels which are arranged in a grid format;

b) a graphic storing means for storing graphic data which represents a graphic image to be displayed, said graphic data consisting of a graphic pixel value for each pixel;

c) an alpha storing means for storing alpha data including alpha foreground data and alpha background data, said alpha data representing an alpha image to be displayed, said alpha data consisting of an alpha pixel value for each pixel;

d) a display structure storing means for storing a display structure value, said display structure value having a priority value assigned to each pixel of the information to be displayed; and e) a logic means for polling the display structure storing means, the alpha storing means and the graphic storing means to obtain the display structure value, the alpha pixel value, and the graphic pixel value, respectively, for each predetermined pixel location of the screen to provide an output of the information, the output of each pixel location being determined by combining the display structure value, the alpha pixel value, and the graphic pixel value in accordance with predetermined logic of the logic means, the output of each pixel location being transmitted to a corresponding pixel location of the bit mapped display means.

2. The apparatus of claim 1 wherein the display structure value indicates one of three display structures, the display structures including:

a) the alpha foreground image is superimposed upon the alpha background image which is then superimposed upon the graphic image;

b) the alpha foreground image is superimpose upon the graphic image which is then superimposed upon the alpha background image, and the graphic image exists at the desired pixel and the alpha image does not exist as the desired pixel, then the graphic pixel value is transmitted; and c) the alpha foreground image is superimposed upon the graphic image which is then superimposed upon the alpha background image and the alpha image exists at the desired pixel, then the alpha pixel value is transmitted to the bit mapped display means.

3. A method of displaying information on a bit mapped display device wherein the information consists of an alpha image and a graphic image, wherein the alpha image includes a foreground and a background, comprising the steps of:

a) storing graphic pixel values in a first pix map;

b) storing alpha pixel values in a second pix map;

c) identifying a pixel of the screen to be drawn;

d) determining a priority value from a third pix map, the priority value indicating a predetermined display structure corresponding to the identified pixel;

e) reading a graphic pixel value from the first pix map and an alpha pixel value from the second pix map; and f) transmitting a resultant pixel value to the bit mapped display device, the resultant pixel value being determined by combining the priority value, the alpha pixel value, and the graphic pixel value in accordance with a predetermined logic arrangement, wherein the predetermined logic arrangement defines one of three display structures, the display structures including:

i) the alpha foreground being superimposed on the alpha background data which is then superimposed upon the graphic image;

ii) the alpha foreground being superimposed upon the graphic image which is then superimposed upon the alpha background, and the graphic image being present at the identified pixel while the alpha image is not present at the identified pixel, the graphic pixel value then being transmitted to the bit mapped display device; and iii) the graphic image being superimposed upon the alpha foreground which is then superimposed upon the alpha background and the graphic image being present at the identified pixel, the graphic pixel value then being transmitted to the bit mapped display device.

* * * * *